US012609542B2

(12) United States Patent
Gong

(10) Patent No.: US 12,609,542 B2
(45) Date of Patent: Apr. 21, 2026

(54) SERIES-PARALLEL BATTERY SYSTEM

(71) Applicant: ZTE CORPORATION, Shenzhen (CN)

(72) Inventor: Yong Gong, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 815 days.

(21) Appl. No.: 17/921,629

(22) PCT Filed: May 20, 2021

(86) PCT No.: PCT/CN2021/094927
§ 371 (c)(1),
(2) Date: Oct. 26, 2022

(87) PCT Pub. No.: WO2021/249151
PCT Pub. Date: Dec. 16, 2021

(65) Prior Publication Data
US 2023/0163604 A1       May 25, 2023

(30) Foreign Application Priority Data
Jun. 9, 2020    (CN) ........................ 202021046380.X

(51) Int. Cl.
*H02J 7/00*       (2026.01)
*H02J 7/50*       (2026.01)
*H02J 7/60*       (2026.01)
(52) U.S. Cl.
CPC ................ *H02J 7/575* (2026.01); *H02J 7/60* (2026.01)
(58) Field of Classification Search
USPC ....................................................... 320/112
See application file for complete search history.

(56) References Cited

U.S. PATENT DOCUMENTS 5,955,867 A * 9/1999 Cummings ............... H02J 7/00
                                                                 320/160
2008/0106234 A1* 5/2008 Yun ..................... H02J 7/00047
                                                                 320/124
2019/0348845 A1    11/2019 Kersey et al.

FOREIGN PATENT DOCUMENTS

CN        107128189 A      9/2017
CN        207150191 A      3/2018
              (Continued)

OTHER PUBLICATIONS

Japan Patent Office, First office action dated Oct. 17, 2023, for corresponding JP application No. 2022-565639.
(Continued)

*Primary Examiner* — Samuel Berhanu
(74) *Attorney, Agent, or Firm* — Li & Cai Intellectual Property (USA) Office

(57)          ABSTRACT
A series-parallel battery system includes: a switch (1), a series-parallel battery (2) and a charge and discharge management circuit (3). The series-parallel battery (2) includes a battery combination management circuit (23) and at least two batteries connected to each other. The battery combination management circuit (23) is connected to the batteries. One battery in the series-parallel battery (2) includes a second battery cell (22) and a third protection circuit (26). Other batteries in the series-parallel battery (2) include a first battery cell (21), a first protection circuit (24) and a second protection circuit (25). The switch (1) is connected to the batteries. The charge and discharge management circuit (3) is connected to the battery combination management circuit (23) and used for controlling states of the switch (1), of the first protection circuit (24), and of the second protection circuit (25), so as to adjust a connection mode of the batteries.

20 Claims, 4 Drawing Sheets

(56)        References Cited

FOREIGN PATENT DOCUMENTS

| | | | |
|---|---|---|---|
| CN | 209088553 | U | 7/2019 |
| JP | 2012249516 | A | 12/2012 |
| JP | 2019193498 | A | 10/2019 |

OTHER PUBLICATIONS

European Patent Office, extended European Patent Search Report dated May 2, 2024, for corresponding EP application No. 21822080.4.

International Search Report of PCT Patent Application No. PCT/CN2021/094927 issued on Jul. 29, 2021.

* cited by examiner

SERIES-PARALLEL BATTERY SYSTEM

CROSS-REFERENCE TO RELATED APPLICATIONS

The present application claims the priority of the patent application No. 202021046380.X, filed with State Intellectual Property Office of P.R.China on Jun. 9, 2020, the entirety of which is incorporated herein by reference.

FIELD OF THE INVENTION

The present disclosure relates to, but is not limited to, the technical field of batteries.

BACKGROUND

Terminals, such as mobile phones and the like, have become important living tools in the scenarios, such as communication interaction, digital entertainment and the like, and a large-capacity battery is a major measure to enhance the endurance of the terminals. The large-capacity battery and frequent usage of a terminal result in that quick charge has become an important aspect for improving user experience. Due to current limit of 5 A (amperes) transmitted in a cable, and in order to enhance charging efficiency and to reduce losses of power transmission and power conversion, high-voltage charging has become a mainstream option. The transmission method for increasing a voltage and decreasing a current can effectively reduce the transmission loss of a line, but the high voltage does not match with the voltage of the battery and cannot be used to directly charge the battery. Even when a power supply of 5V (volts) is used for charging the battery, a power conversion chip is required to convert the voltage from the power supply of 5V into a voltage suitable for charging the battery.

SUMMARY

Embodiments of the present disclosure provide a series-parallel battery system including: a switch, a series-parallel battery and a charge and discharge management circuit. The series-parallel battery includes a battery combination management circuit and at least two batteries connected to each other. The battery combination management circuit is connected to the batteries. One battery in the series-parallel battery includes a second battery cell and a third protection circuit. Other batteries in the series-parallel battery include a first battery cell, a first protection circuit and a second protection circuit. The switch is connected to the batteries. The charge and discharge management circuit is connected to the battery combination management circuit and configured to control the states of the switch, of the first protection circuit and of the second protection circuit, so as to adjust a connection mode of the batteries in the series-parallel battery.

BRIEF DESCRIPTION OF THE DRAWINGS

FIG. 1b is a schematic diagram of a structure of a series-parallel battery system including the series-parallel battery in FIG. 1a;

FIG. 1c is a schematic diagram of an exemplary circuit of the series-parallel battery in FIG. 1a;

FIG. 2b is a schematic diagram of a structure of a series-parallel battery system including the series-parallel battery in FIG. 2a; and FIG. 2c is a schematic diagram of an exemplary circuit of the series-parallel battery in FIG. 2a.

DETAILED DESCRIPTION OF THE EMBODIMENTS

Figure 1A:
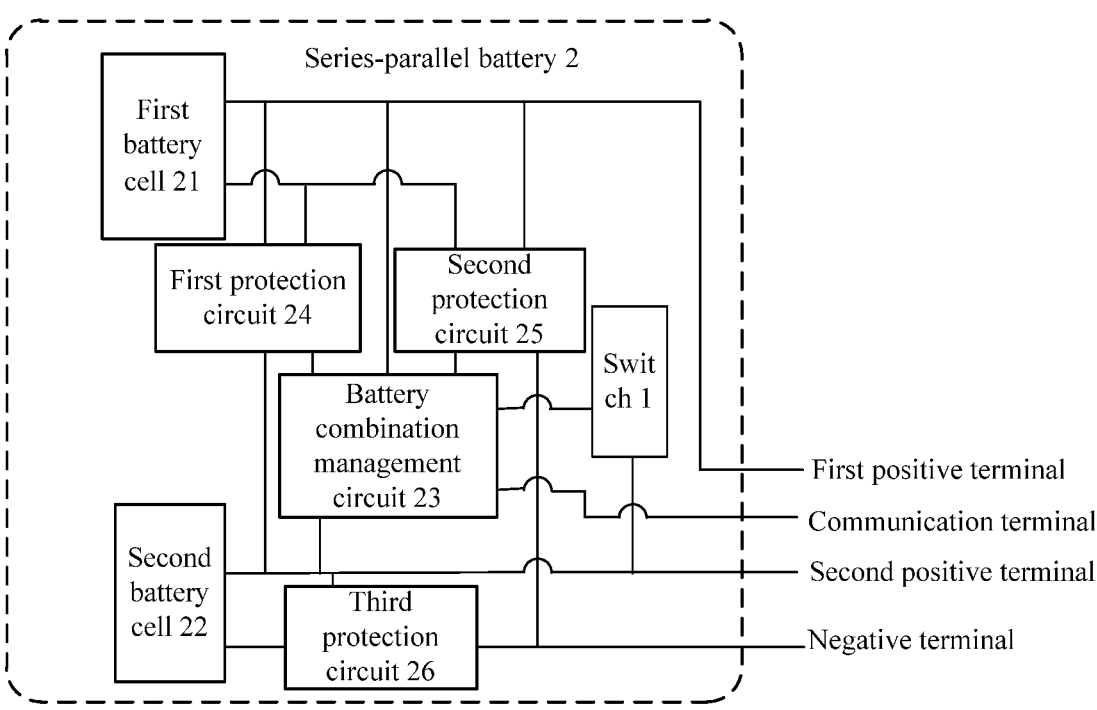
FIG. 1a is a schematic diagram of a structure of a series-parallel battery in a series-parallel battery system provided in the present disclosure.

Exemplary embodiments will be described more fully hereinafter with reference to the accompanying drawings, but the exemplary embodiments may be embodied in different forms and should not be construed as being limited to the embodiments set forth herein. Rather, the purpose of providing these embodiments is to make the present disclosure thorough and complete and to enable those skilled in the art to fully understand the scope of the present disclosure.

As used herein, the term "and/or" includes any or all combinations of one or more of the associated listed items.

The terms used herein are used only to describe particular embodiments and are not intended to limit the present disclosure. As used herein, the singular forms of "a" and "the" are also intended to include plural forms, unless the context clearly indicates otherwise. It is also to be understood that when the terms "include" and/or "constituted of . . . " are used in this specification, it means that the features, wholes, steps, operations, components, and/or assemblies are present, but the presence or addition of one or more other features, wholes, steps, operations, components, assemblies, and/or groups thereof is not excluded.

The embodiments described herein may be described with reference to plane views and/or sectional views with the aid of ideal schematic diagrams of the present disclosure. Thus, example illustrations may be modified according to manufacturing techniques and/or tolerances. Thus, embodiments are not limited to the embodiments shown in the accompanying drawings, but include modifications of the configurations based on manufacturing processes. Thus, the areas illustrated in the accompanying drawings have schematic properties and the shapes of the areas shown illustrates the specific shapes of the areas of the components, but are not intended for limiting.

Unless otherwise specified, all terms used herein (including technical and scientific terms) have the same meaning as commonly understood by those of ordinary skill in the art. It is also to be understood that terms such as those defined in frequently-used dictionaries should be construed as having meanings consistent with their meanings in the context of the related art and the present disclosure, and will not be construed as having idealized or over-formal meanings, unless expressly limited in such a manner herein.

Currently, a solution for adapting a high voltage to a battery voltage is to connect batteries in series. The power loss due to power conversion may be reduced by adapting the batteries in series to an input of a high voltage, which still has the following defects (1) to (3). (1) Supply of power from a single battery is merely supported in a circuit system, and thus a power supply chip is required to convert the batteries in series into a corresponding power supply for outputting, which also results in a certain loss. (2) As for conventional charging of 5V to the batteries in series, an additional boost circuit is required to adapt to charging the batteries in series, which has a low boost conversion efficiency. (3) Fixed batteries in series result to discharge loss while reducing charge loss, and with the popularity of 5G, the overall power of a system increases and the endurance may also be significantly reduced due to the discharge loss.

Thus, the present disclosure particularly provides a series-parallel battery system, which substantially avoids one or more of the problems due to the disadvantages and limitations in the related art.

The present disclosure provides a series-parallel battery system. As shown in FIG. 1a, FIG. 1b, FIG. 2a and FIG. 2b, the series-parallel battery system includes a switch 1, a series-parallel battery 2 and a charge and discharge management circuit 3. The series-parallel battery 2 includes a battery combination management circuit 23 and at least two batteries connected to each other. The battery combination management circuit 23 is connected to the batteries. One battery in the series-parallel battery includes a second battery cell 22 and a third protection circuit 26. Other batteries in the series-parallel battery 2 include a first battery cell 21, a first protection circuit 24 and a second protection circuit 25. The switch 1 is connected to the batteries. The charge and discharge management circuit 3 is connected to the battery combination management circuit 23 and configured to control the states of the switch 1, of the first protection circuit 24 and of the second protection circuit 25, so as to adjust the connection mode of the batteries in the series-parallel battery.

The states of the switch 1, of the first protection circuit 24 and of the second protection circuit 25 include an on state and an off state. The combination of the different states of the switch 1, of the first protection circuit 24 and of the second protection circuit 25 may form the connection modes, i.e., series connection or parallel connection of the batteries in the series-parallel battery 2. It should be noted that in an implementation of the present disclosure, the third protection circuit 26 is always in an on state.

In one battery, a battery cell is used for electric quantity storage, and a protection circuit is used to detect a voltage and a current across two ends of the battery cell, so as to prevent the battery cell from overcharge and over-discharge. The first protection circuit 24 or the second protection circuit 25 cooperates with the first battery cell 21 to implement the charge or discharge of one battery. The second battery cell 22 cooperates with the third protection circuit 26 to implement the charge and discharge of another battery. The battery combination management circuit 23 controls the switch 1 and the protection circuits of the batteries to be on or off according to an adjusting instruction from the charge and discharge management circuit 3, so as to achieve combination of the series or parallel connection of the batteries. Or, the charge and discharge management circuit 3 controls the switch 1 to be on or off to achieve the combination of the series or parallel connection of the batteries.

The series-parallel battery system in the present disclosure includes a switch 1, a series-parallel battery 2 and a charge and discharge management circuit 3. The series-parallel battery 2 includes a battery combination management circuit 23 and at least two batteries connected to each other. The battery combination management circuit 23 is connected to the batteries. One battery in the series-parallel battery includes a second battery cell 22 and a third protection circuit 26. Other batteries in the series-parallel battery 2 include a first battery cell 21, a first protection circuit 24 and a second protection circuit 25. The switch 1 is connected to the batteries. The charge and discharge management circuit 3 is connected to the battery combination management circuit 23 and configured to control the states of the switch 1, of the first protection circuit 24 and of the second protection circuit 25, so as to adjust the connection mode of the batteries. In the implementation of the present disclosure, the battery cells of the batteries in the series-parallel battery may be connected in a series or parallel connection mode, and the connection mode may be freely switched. Compared with an existing single battery power supply system, a voltage of the batteries in series may be converted into a voltage of a single battery, without a power supply chip, thereby effectively improving the discharge efficiency. Compared with existing charging to fixed batteries in series, a power supply of 5V may adapt to charging to the batteries in series, without an additional boost circuit, thereby effectively enhancing the charge efficiency.

In some implementations, the charge and discharge management circuit 3 may be arranged on a main board.

An existing solution of series charging and parallel discharging is to arrange a combination of four switches between two batteries in series to meet different charge and discharge demands. However, the solution has the following defects (1) and (2). (1) In both a charging series and a discharging stage, two switches in the circuit will work, which will increase the impedance loss of the switches. For example, as for charging of 65 W (watts), when a current entering the batteries is greater than 5 A, a switch impedance loss of 10 milliohms will also result in a switch conduction loss of greater than 0.25 W. (2) Multiple electronic switches are used to implement the circuit, and may occupy a large area of the circuit, especially a circuit in a mobile terminal, resulting in difficulty of implementation of the circuit.

In order to solve the above problems, in the series-parallel battery system in the present disclosure, one switch 1 is used to achieve switching between the series connection and the parallel connection of the batteries in the series-parallel battery 2.

Figure 1B:
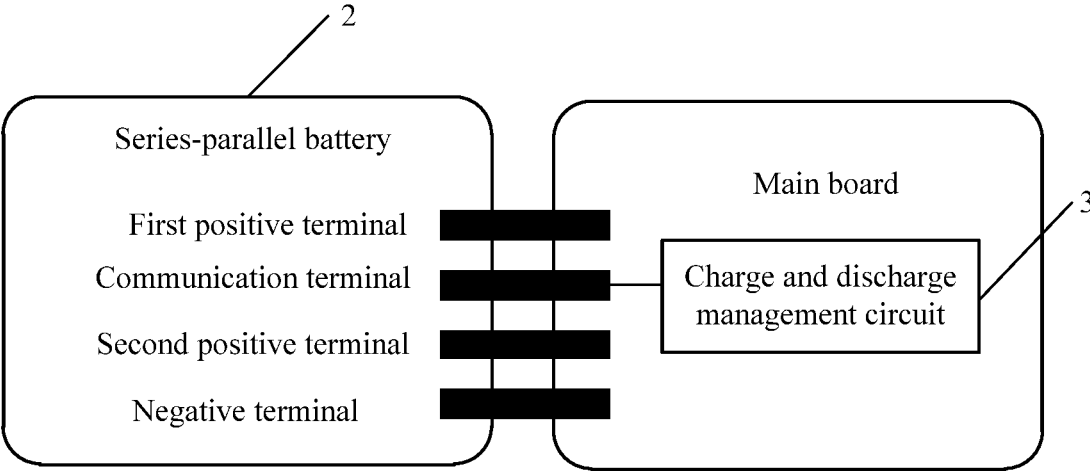

In some implementations, as shown in FIG. 1a and FIG. 1b, the switch 1 is arranged in the series-parallel battery 2, and the battery combination management circuit 23 is connected to the switch 1 and configured to control the state of the switch 1 according to the instruction from the charge and discharge management circuit 3. That is, the charge and discharge management circuit 3 determines the connection mode of the batteries and sends the adjusting instruction to the battery combination management circuit 23, and the battery combination management circuit 23 controls the state of the switch 1 according to the adjusting instruction.

Figure 2A:
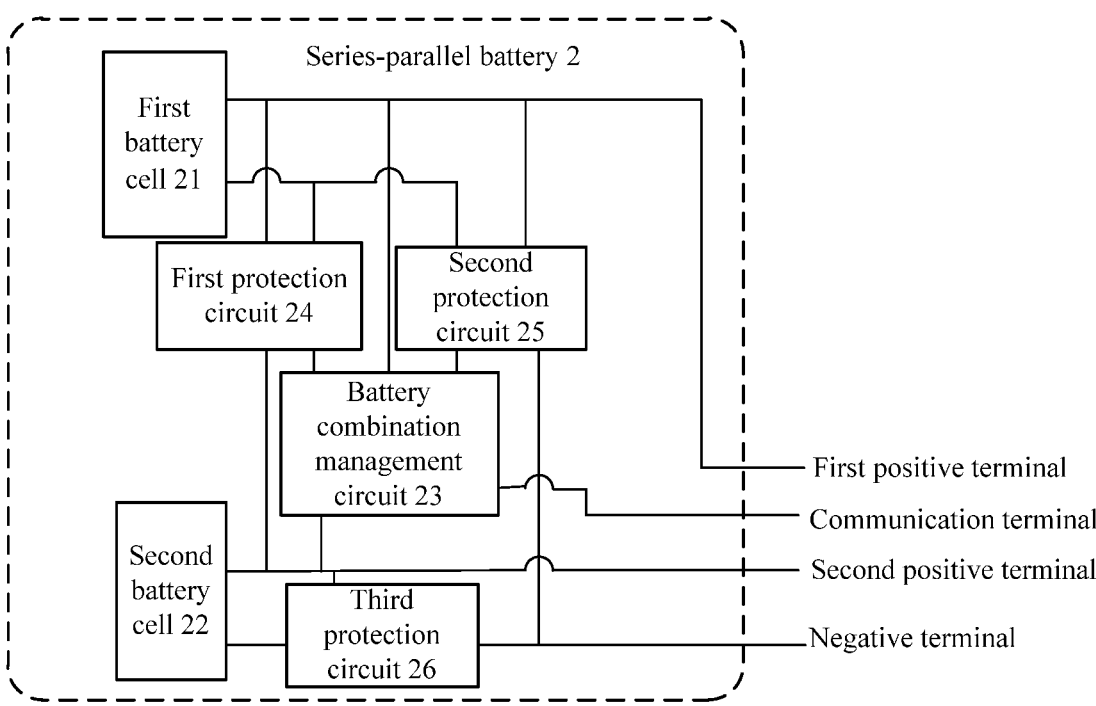
FIG. 2a is a schematic diagram of a structure of a series-parallel battery in a series-parallel battery system provided in the present disclosure.
Figure 2B:
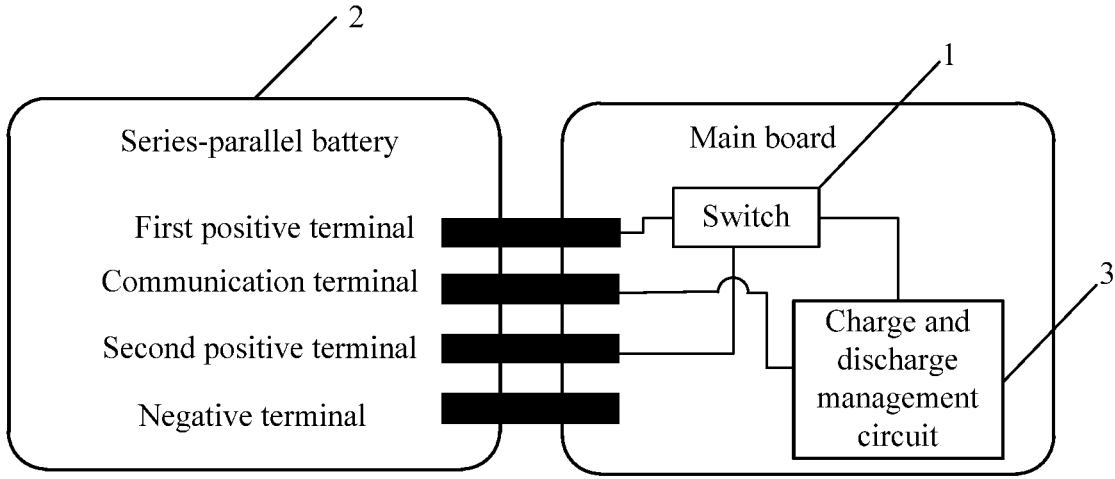

In some implementations, as shown in FIG. 2b, the switch 1 is arranged on the main board, and the charge and discharge management circuit 3 is connected to the switch 1. That is, the charge and discharge management circuit 3 directly controls the switch 1, without through the battery combination management circuit 23.

In the implementation of the present disclosure, the number of the switch 1 is reduced. Only one switch 1 is used to achieve switch between the battery connection mode in a charging state and the battery connection mode in a discharging state, such that the impedance loss on a charge and discharge loop is reduced, the charge and discharge efficiency is further enhanced, the circuit layout can also be optimized, the terminal equipment is advantageously lighter and thinner, and the cost is reduced.

As shown in FIG. 1a and FIG. 1b, a first terminal of the first battery cell 21 is connected to a first positive terminal of the series-parallel battery 2, a third terminal of the first protection circuit 24, a third terminal of the second protection circuit 25 and a third terminal of the battery combination management circuit 23. A second terminal of the first battery cell 21 is connected to a first terminal of the first protection circuit 24 and a first terminal of the second protection circuit 25.

A first terminal of the second battery cell 22 is connected to a second terminal of the first protection circuit 24, a third terminal of the third protection circuit 26, a second positive terminal of the series-parallel battery 2 and a seventh terminal of the battery combination management circuit 23. A second terminal of the second battery cell 22 is connected to a first terminal of the third protection circuit 26. A first terminal of the battery combination management circuit 23 is connected to a fourth terminal of the first protection circuit 24. A second terminal of the battery combination management circuit 23 is connected to a fourth terminal of the second protection circuit 25. A sixth terminal of the battery combination management circuit 23 is connected to a communication terminal of the series-parallel battery 2. A second terminal of the third protection circuit 26 is connected to a second terminal of the second protection circuit 2 and a negative terminal of the series-parallel battery 2.

In some implementations, as shown in FIG. 1*a*, the switch 1 is arranged in the series-parallel battery 2. A first terminal of the switch 1 is connected to the first positive terminal of the series-parallel battery 2. A second terminal of the switch 1 is connected to the second positive terminal of the series-parallel battery 2. A third terminal of the switch 1 is connected to a fourth terminal of the battery combination management circuit 23. The charge and discharge management circuit 3 is connected to the sixth terminal of the battery combination management circuit 23 through the communication terminal of the series-parallel battery 2.

In some implementations, as shown in FIG. 2*a* and FIG. 2*b*, the switch 1 is arranged on the main board. A first terminal of the switch 1 is connected to the first positive terminal of the series-parallel battery 2. A second terminal of the switch 1 is connected to the second positive terminal of the series-parallel battery 2. A third terminal of the switch 1 is connected to a first terminal of the charge and discharge management circuit 3. A second terminal of the charge and discharge management circuit 3 is connected to the sixth terminal of the battery combination management circuit 23 through the communication terminal of the series-parallel battery 2.

Figure 1C:
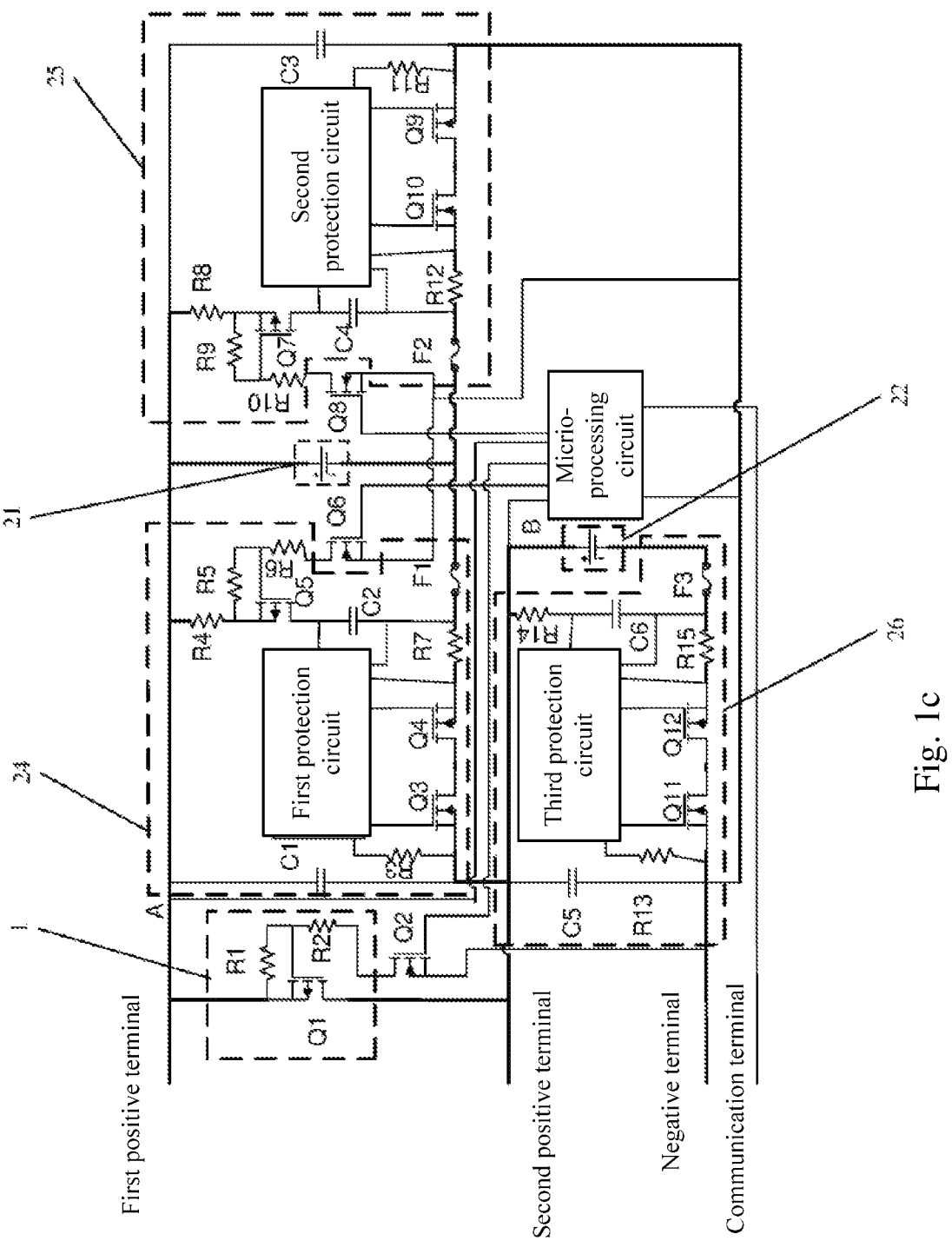
Figure 2C:
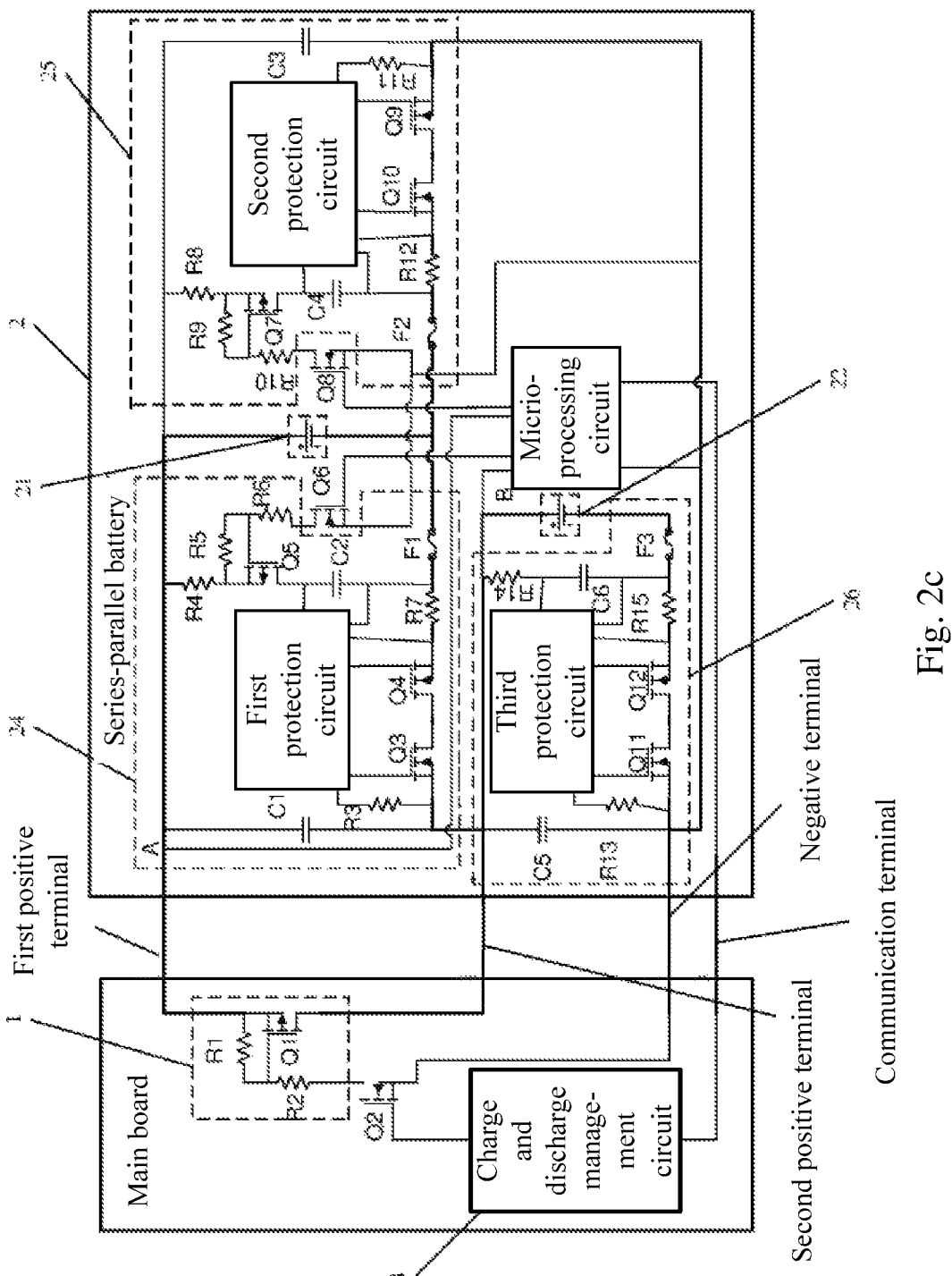

Compared with the solution shown in FIG. 1*a* to FIG. 1*c*, in the solution shown in FIG. 2*a* to FIG. 2*c*, internal circuits of the series-parallel battery 2 can be simplified by moving the switch 1 from the inside of the series-parallel battery 2 to the main board and by controlling the switch 1 to be on and off by means of the charge and discharge management circuit 3.

In some implementations, as shown in FIG. 1*a*, FIG. 1*c*, FIG. 2*a* and FIG. 2*c*, the battery combination management circuit 23 includes a micro-processing circuit (e.g., a micro-processing chip, a microprocessor or a microcontroller), a second transistor Q2, a sixth transistor Q6 and an eighth transistor Q8. A second electrode of the second transistor Q2 is the fourth terminal of the battery combination management circuit 23. A control electrode of the second transistor Q2 is connected to the micro-processing circuit. A second electrode of the sixth transistor Q6 is the first terminal of the battery combination management circuit 23. A control electrode of the sixth transistor Q6 is connected to the micro-processing circuit. A second electrode of the eighth transistor Q8 is the second terminal of the battery combination management circuit 23. A control electrode of the eighth transistor Q8 is connected to the micro-processing circuit. A first electrode of the second transistor Q2, a first electrode of the sixth transistor Q6 and a first electrode of the eighth transistor Q8 are respectively connected to the positive terminal of the series-parallel battery 2. The third terminal, the sixth terminal and the seventh terminal of the battery combination management circuit 23 are ports of the micro-processing circuit.

In some implementations, as shown in FIG. 1*c* and FIG. 2*c*, the switch 1 includes a first transistor Q1 a first resistor R1 and a second resistor R2. A control electrode of the first transistor Q1 is connected to a second terminal of the first resistor R1 and a first terminal of the second resistor R2. A first electrode of the first transistor Q1 is the first terminal of the switch 1 and is connected to a first terminal of the first resistor R1. A second electrode of the first transistor Q1 is the second terminal of the switch 1. A second terminal of the second resistor R2 is the third terminal of the switch 1.

The first transistor Q1 implements an on-off action. The micro-processing circuit turns the first transistor Q1 on or off by controlling the second transistor Q2. When the second transistor Q2 is turned on, resistor voltage division is achieved by the first resistor R1 and the second resistor R2, such that the first transistor Q1 is also turned on. At this time, the switch 1 is turned on, and the first positive terminal is connected to the second positive terminal, thereby realizing parallel connection of the first battery cell 21 to the second battery cell 22. When the second transistor Q2 is turned off, the first transistor Q1 is also turned off. At this time, the switch 1 is turned off, and the first positive terminal is disconnected to the second positive terminal, thereby realizing series connection of the first battery cell 21 to the second battery cell 22.

In the solution of FIG. 1*a* to FIG. 1*c*, the micro-processing circuit communicates with the charge and discharge management circuit 3 through the communication terminal, so as to determine and control the first battery cell 21 and the second battery cell 22 being in a series or parallel connection state. In the whole battery charging and discharging process, voltage sampling is performed at point A and point B by the micro-processing circuit, so as to determine voltages of the first battery cell 21 and of the second battery cell 22. In the solution of FIG. 2*a* to FIG. 2*b*, the charge and discharge management circuit 3 directly controls the second transistor Q2 to be on or off by controlling the level of the control electrode of the second transistor Q2.

In some implementations, as shown in FIG. 1*c* and FIG. 2*c*, the first protection circuit 24 includes a first protection chip, a third transistor Q3, a fourth transistor Q4, a fifth transistor Q5, a fourth resistor R4, a fifth resistor R5, a sixth resistor R6, a first capacitor C1 and a second capacitor C2. A first terminal of the second capacitor C2 is the first terminal of the first protection circuit 24 and is connected to the first protection chip. A second electrode of the third transistor Q3 is the second terminal of the first protection circuit and is connected to a second terminal of the first capacitor C1. A second terminal of the fourth resistor R4 is the third terminal of the first protection circuit and is connected to a first terminal of the first capacitor C1. A control electrode of the fifth transistor Q5 is connected to a second terminal of the fifth resistor R5 and a first terminal of the sixth resistor R6. A second terminal of the sixth resistor R6 is the fourth terminal of the first protection circuit 24. A first electrode of the fifth transistor Q5 is connected to a first terminal of the fifth resistor R5 and a first terminal of the fourth resistor R4. A second electrode of the fifth transistor Q5 is connected to the first protection chip and a second terminal of the second capacitor C2. A control electrode of the third transistor Q3 and a control electrode of the fourth transistor Q4 are respectively connected to the first protection chip. A first electrode of the third transistor Q3 is connected to a second electrode of the fourth transistor Q4. A first electrode of the fourth transistor Q4 is connected to the first terminal of the second capacitor C2. The third transistor Q3, the fourth transistor Q4 and the first protection chip are implemented to prevent the first battery cell 21 under a series architecture from overcurrent of a discharge current and overvoltage of a charge voltage.

The sixth transistor Q6 is used for controlling whether the first protection chip is enabled or not (i.e., whether the first protection circuit 24 is enabled or not). The fifth transistor Q5 is turned on by the level of the control electrode of the sixth transistor Q6 controlled by the micro-processing circuit, such that the first protection chip is controlled to be in a working state and thus the first battery cell 21 is connected in series to the second battery cell 22. The fifth resistor R5 and the sixth resistor R6 are used for cooperating with the turn-on or turn-off state of the fifth transistor Q5 and the sixth transistor Q6, and the fourth resistor R4 and the second capacitor C2 are used for cooperating with the working of the first protection chip and voltage sampling of the first battery cell 21, so as to cooperatively realize overvoltage protection.

The first protection chip is used to control the turn-on and turn-off of the third transistor Q3 and the fourth transistor Q4. The micro-processing circuit is used to control the turn-on and turn-off of the sixth transistor Q6. The first electrode of the fifth transistor Q5 is connected to the first terminal of the first battery cell 21 (i.e., the positive terminal of the battery cell) and the first positive terminal of the series-parallel battery 2 through the fourth resistor R4. The second electrode of the fifth transistor Q5 is connected to power supply pins of the first protection chip to supply power to the first protection chip, while the first protection chip monitors the voltage of the first battery cell 21. When the sixth transistor is turned on, resistor voltage division is implemented by the fifth resistor R5 and the sixth resistor R6, such that the fifth transistor Q5 is turned on. After the fifth transistor Q5 is turned on, the first protection chip controls the on state and off state of the third transistor Q3 and the fourth transistor Q4 according to the state of the first battery cell 21. During charging, if a charge voltage or current exceeds a charging curve range of the first battery cell, the first protection chip controls the third transistor Q3 to be off. During discharging, if a discharge voltage or current exceeds a discharging curve range of the first battery cell, the first protection chip controls the fourth transistor Q4 to be off. If charging and discharging are normal and within the curve range, the first protection chip controls the third transistor Q3 and the fourth transistor Q4 to be on, and the second terminal of the first battery cell 21 (i.e., the negative terminal of the battery cell) is connected to the first terminal of the second battery cell 22, thereby realizing series connection of the first battery cell 21 to the second battery cell 22. When the sixth transistor Q6 is turned off, the fifth transistor Q5 is also turned off. The first protection chip is not supplied with power and then stops working, while the third transistor Q3 and the fourth transistor Q4 cannot be provided with a level for driving and then are in an off state, and thus the second terminal of the first battery cell 21 is disconnected to the first terminal of the second battery cell 22. When the first protection chip is in a working state, the first transistor Q1 is in an off state, that is, the micro-processing circuit controls the second transistor Q2 to be in an off state.

In some implementations, as shown in FIG. 1c and FIG. 2c, the second protection circuit 25 includes a second protection chip, a seventh transistor Q7, a ninth transistor Q9, a tenth transistor Q10, an eighth resistor R8, a ninth resistor R9, a tenth resistor R10, a third capacitor C3 and a fourth capacitor C4. A first terminal of the fourth capacitor C4 is the first terminal of the second protection circuit 25 and is connected to the second protection chip. A second electrode of the ninth transistor Q9 is the second terminal of the second protection circuit and is connected to a second terminal of the third capacitor C3. A second terminal of the eighth resistor R8 is the third terminal of the second protection circuit 25 and is connected to a first terminal of the third capacitor C3. A control electrode of the seventh transistor Q7 is connected to a second terminal of the ninth resistor R9 and a first terminal of the tenth resistor R10. A second terminal of the tenth resistor R10 is the fourth terminal of the second protection circuit 25. A first electrode of the seventh transistor Q7 is connected to a first terminal of the ninth resistor R9 and a first terminal of the eighth resistor R8. A second electrode of the seventh transistor Q7 is connected to the second protection chip and a second terminal of the fourth capacitor C4. A control electrode of the ninth transistor Q9 and a control electrode of the tenth transistor Q10 are respectively connected to the second protection chip. A first electrode of the ninth transistor Q9 is connected to a second electrode of the tenth transistor Q10. A first electrode of the tenth transistor Q10 is connected to a first terminal of the fourth capacitor C4. The ninth transistor Q9, the tenth transistor Q10 and the second protection chip are implemented to prevent the first battery cell 21 under a parallel architecture from overcurrent of a discharge current and overvoltage of a charge voltage.

The eighth transistor Q8 is used for controlling whether the second protection chip is enabled or not (i.e., whether the second protection circuit 25 is enabled or not). The seventh transistor Q7 is turned on by the level of the control electrode of the eighth transistor Q8 controlled by the micro-processing circuit, such that the second protection chip is controlled to be in a working state, and thus the first battery cell 21 is connected in parallel to the second battery cell 22. The ninth resistor R9 and the tenth resistor R10 are used for cooperating with the turn-on or turn-off state of the seventh transistor Q7 and the eighth transistor Q8, and the eighth resistor R8 and the fourth capacitor C4 are used for cooperating with the working of the second protection chip and voltage sampling of the first battery cell 21, so as to cooperatively realize overvoltage protection. It should be noted that the first protection chip and the second protection chip cannot be enabled at the same time.

The second protection circuit 25 has the same working process as the first protection circuit 24, which will not be described in detail herein.

In some implementations, as shown in FIG. 1c and FIG. 2c, the third protection circuit 26 includes a third protection chip, an eleventh transistor Q11, a twelfth transistor Q12, a fourteenth resistor R14, a fifth capacitor C5 and a sixth capacitor C6. A first terminal of the sixth capacitor C6 is the first terminal of the third protection circuit 26 and is connected to the third protection chip. A second electrode of the eleventh transistor Q11 is the second terminal of the third protection circuit 26 and is connected to a second terminal of the fifth capacitor C5. A first terminal of the fourteenth resistor R14 is the third terminal of the third protection circuit 26 and is connected to a first terminal of the fifth capacitor C5. A second terminal of the fourteenth resistor R14 is connected to the third protection chip and a second terminal of the sixth capacitor C6. A control electrode of the eleventh transistor Q11 and a control electrode of the twelfth transistor Q12 are respectively connected to the third protection chip. A first electrode of the eleventh transistor Q11 is connected to a second electrode of the twelfth transistor Q12. A first electrode of the twelfth transistor Q12 is connected to a first terminal of the sixth capacitor C6. The eleventh transistor Q11, the twelfth transistor Q12 and the third protection chip are implemented to prevent the second battery cell 22 from overcurrent of a discharge current and overvoltage of a charge voltage.

The third protection chip is used to control the eleventh transistor Q11 and the twelfth transistor Q12 to be on and off. The first terminal of the second battery cell 22 is connected to power supply pins of the third protection chip through the fourteenth resistor R14 to supply power to the third protection chip, while the third protection chip is used to monitor the voltage of the second battery cell 22. The third protection chip controls the eleventh transistor Q11 and the twelfth transistor Q12 to be on and off according to the state of the second battery cell 22. During charging, if a charge voltage or current exceeds a charging curve range of the second battery cell 22, the third protection chip controls the eleventh transistor Q11 to be off. During discharging, if a discharge voltage or current exceeds a discharging curve range of the second battery cell, the third protection chip controls the twelfth transistor Q12 to be off. If charging and discharging are normal and within the curve range, the third protection chip controls the eleventh transistor Q11 and the twelfth transistor Q12 to be on and connects the second terminal of the second battery cell 22 to the negative terminal of the series-parallel battery 2.

In some implementations, as shown in FIG. 1c and FIG. 2c, the first protection circuit 24 may further include a first current sampling resistor R7. A first terminal of the first current sampling resistor R7 is connected to the first terminal of the fourth transistor Q4 and the first protection chip. A second terminal of the first current sampling resistor R7 is connected to the first terminal of the second capacitor C2 and the first protection chip. And/or, the second protection circuit 25 may further include a second current sampling resistor R12. A first terminal of the second current sampling resistor R12 is connected to the first electrode of the tenth transistor Q10 and the second protection chip. A second terminal of the second current sampling resistor R12 is connected to the first terminal of the fourth capacitor C4 and the second protection chip. And/or, the third protection circuit 26 may further include a third current sampling resistor R15. A first terminal of the third current sampling resistor R15 is connected to the first electrode of the twelfth transistor Q12 and the third protection chip. A second terminal of the third current sampling resistor R15 is connected to the first terminal of the sixth capacitor C6 and the third protection chip.

A current that passes through the first current sampling resistor R7 may be obtained by the first protection chip according to I=U/R by detecting voltages across the two ends of the first current sampling resistor R7. A current that passes through the second current sampling resistor R12 may be obtained by the second protection chip according to I=U/R by detecting voltages across the two ends of the second current sampling resistor R12. A current that passes through the third current sampling resistor R15 may be obtained by the third protection chip according to I=U/R by detecting voltages across the two ends of the second current sampling resistor R15. It should be noted that the currents may be measured by other methods, and in this case, the current sampling resistors may be omitted.

In some implementations, as shown in FIG. 1c and FIG. 2c, the first protection circuit 24 may further include a first voltage sampling resistor R3. A first terminal of the first voltage sampling resistor R3 is connected to the first protection chip. A second terminal of the first voltage sampling resistor R3 is connected to the second electrode of the third transistor Q3. And/or, the second protection circuit 25 may further include a second voltage sampling resistor R11. A first terminal of the second voltage sampling resistor R11 is connected to the second protection chip. A second terminal of the second voltage sampling resistor R11 is connected to the second electrode of the ninth transistor Q9. And/or, the third protection circuit 26 may further include a third voltage sampling resistor R13. A first terminal of the third voltage sampling resistor R13 is connected to the third protection chip. A second terminal of the third voltage sampling resistor R13 is connected to the second electrode of the eleventh transistor Q11.

The first protection chip performs voltage sampling on the voltage at the negative terminal of the first battery cell 21 through the first voltage sampling resistor R3. The second protection chip performs voltage sampling on the voltage at the negative terminal of the first battery cell 21 through the second voltage sampling resistor R11. The third protection chip performs voltage sampling on the voltage at the negative terminal of the second battery cell 22 through the third voltage sampling resistor R13.

In some implementations, as shown in FIG. 1c and FIG. 2c, the first protection circuit 24 may further include a first thermistor F1. A second terminal of the first thermistor F1 is connected to the first terminal of the second capacitor C2. A first terminal of the first thermistor F1 is the first terminal of the first protection circuit 24. And/or, the second protection circuit 25 may further include a second thermistor F2. A second terminal of the second thermistor F2 is connected to the first terminal of the fourth capacitor C4. A first terminal of the second thermistor F2 is the first terminal of the second protection circuit 25. And/or, the third protection circuit 26 may further include a third thermistor F3. A second terminal of the third thermistor F3 is connected to the first terminal of the sixth capacitor C6. A first terminal of the third thermistor F3 is the first terminal of the third protection circuit 26.

When the temperature of the battery cell exceeds a certain range, the thermistor has a high resistance value which increases the internal resistance of the battery, such that the circuit in a system is unable to obtain a corresponding voltage and a corresponding current, and is unable to work normally. It should be noted that if there are other temperature monitoring and response controls, the first thermistor F1, the second thermistor F2 and the third thermistor F3 may be replaced.

It should be noted that, in the implementation of the present disclosure, as an example, the first transistor Q1, the fifth transistor Q5 and the seventh transistor Q7 are PMOS transistors, and the second transistor Q2, the third transistor Q3, the fourth transistor Q4, the sixth transistor Q6, and the eighth transistor Q8 to the twelfth transistor Q12 are NMOS transistors.

The solution shown in FIG. 2a to FIG. 2c differs from the solution shown in FIG. 1a to FIG. 1c in that the switch 1 is arranged on the main board, and the charge and discharge management circuit 3 controls the first transistor Q1 to be on or off, that is, the first transistor Q1 is controlled to be on or off by the level of the control electrode of the second transistor Q2 controlled by the charge and discharge management circuit 3. The solution shown in FIG. 2a to FIG. 2c is the same as the solution shown in FIG. 1a to FIG. 1c in terms of the structure of the series-parallel battery 2 and the connection relation of the devices.

Exemplary implementations have been disclosed herein, and although specific terms are adopted, they are used and should be construed only as a general illustrative meaning and not for purpose of limitation. In some instances, it is apparent to those skilled in the art that features, characteristics and/or elements described in combination with a specific implementation can be used alone, or can be used in combination with features, characteristics and/or elements described in combination with other implementations, unless otherwise stated expressly. Accordingly, it will be understood by those skilled in the art that various changes in form and detail can be made without departing from the scope of the present disclosure as set forth in the appended claims.

The invention claimed is:

1. A series-parallel connection battery system, comprising: a switch, a series-parallel connection battery and a charge and discharge management circuit, wherein the series-parallel connection battery comprises a battery combination management circuit and two batteries connected to each other; the battery combination management circuit is connected to the batteries; one battery in the series-parallel connection battery comprises a second battery cell and a third protection circuit; another battery in the series-parallel connection battery comprise a first battery cell, a first protection circuit and a second protection circuit; and the switch is connected to the batteries; and the charge and discharge management circuit is connected to the battery combination management circuit and configured to control states of the switch, of the first protection circuit and of the second protection circuit, so as to adjust a connection mode of the batteries in the series-parallel connection battery, wherein when the charge and discharge management circuit controls the state of the switch to on, the connection mode of the batteries in the series-parallel connection battery is parallel connection, and the charge and discharge management circuit controls the state of the first protection circuit to be not enabled and the state of the second protection circuit to be enabled, and when the charge and discharge management circuit controls the state of the switch to off, the connection mode of the batteries in the series-parallel connection battery is series connection, and the charge and discharge management circuit controls the state of the first protection circuit to be enabled and the state of the second protection circuit to be not enabled.

2. The series-parallel connection battery system according to claim 1, wherein the charge and discharge management circuit is arranged on a main board;

the switch is arranged in the series-parallel connection battery; and the battery combination management circuit is connected to the switch and configured to control a state of the switch according to an instruction from the charge and discharge management circuit.

3. The series-parallel connection battery system according to claim 2, wherein a first terminal of the first battery cell is connected to a first positive terminal of the series-parallel connection battery, a third terminal of the first protection circuit, a third terminal of the second protection circuit and a third terminal of the battery combination management circuit; and a second terminal of the first battery cell is connected to a first terminal of the first protection circuit and a first terminal of the second protection circuit;

a first terminal of the second battery cell is connected to a second terminal of the first protection circuit, a third terminal of the third protection circuit, a second positive terminal of the series-parallel connection battery and a seventh terminal of the battery combination management circuit; and a second terminal of the second battery cell is connected to a first terminal of the third protection circuit;

a first terminal of the battery combination management circuit is connected to a fourth terminal of the first protection circuit; a second terminal of the battery combination management circuit is connected to a fourth terminal of the second protection circuit; and a sixth terminal of the battery combination management circuit is connected to a communication terminal of the series-parallel connection battery; and a second terminal of the third protection circuit is connected to a second terminal of the second protection circuit and a negative terminal of the series-parallel connection battery.

4. The series-parallel connection battery system according to claim 3, wherein the switch is arranged in the series-parallel connection battery, a first terminal of the switch is connected to the first positive terminal of the series-parallel connection battery, a second terminal of the switch is connected to the second positive terminal of the series-parallel connection battery, and a third terminal of the switch is connected to a fourth terminal of the battery combination management circuit; and the charge and discharge management circuit is connected to the sixth terminal of the battery combination management circuit through the communication terminal of the series-parallel connection battery.

5. The series-parallel connection battery system according to claim 4, wherein the battery combination management circuit comprises: a micro-processing circuit, a second transistor, a sixth transistor and an eighth transistor;

a second electrode of the second transistor is the fourth terminal of the battery combination management circuit, and a control electrode of the second transistor is connected to the micro-processing circuit;

a second electrode of the sixth transistor is the first terminal of the battery combination management circuit, and a control electrode of the sixth transistor is connected to the micro-processing circuit;

a second electrode of the eighth transistor is the second terminal of the battery combination management circuit, and a control electrode of the eighth transistor is connected to the micro-processing circuit;

a first electrode of the second transistor, a first electrode of the sixth transistor and a first electrode of the eighth transistor are respectively connected to the negative terminal of the series-parallel connection battery; and the third terminal, the sixth terminal and the seventh terminal of the battery combination management circuit are ports of the micro-processing circuit.

6. The series-parallel connection battery system according to claim 4, wherein the switch comprises a first transistor, a first resistor and a second resistor;

a control electrode of the first transistor is connected to a second terminal of the first resistor and a first terminal of the second resistor; a first electrode of the first transistor is the first terminal of the switch and is connected to a first terminal of the first resistor; and a second electrode of the first transistor is the second terminal of the switch; and a second terminal of the second resistor is the third terminal of the switch.

7. The series-parallel connection battery system according to claim 4, wherein the first protection circuit comprises: a first protection chip, a third transistor, a fourth transistor, a fifth transistor, a fourth resistor, a fifth resistor, a sixth resistor, a first capacitor and a second capacitor;

a first terminal of the second capacitor is the first terminal of the first protection circuit and is connected to the first protection chip;

a second electrode of the third transistor is the second terminal of the first protection circuit and is connected to a second terminal of the first capacitor; and a second terminal of the fourth resistor is the third terminal of the first protection circuit and is connected to a first terminal of the first capacitor;

a control electrode of the fifth transistor is connected to a second terminal of the fifth resistor and a first terminal of the sixth resistor, a second terminal of the sixth resistor is the fourth terminal of the first protection circuit, a first electrode of the fifth transistor is connected to a first terminal of the fifth resistor and a first terminal of the fourth resistor, and a second electrode of the fifth transistor is connected to the first protection chip and a second terminal of the second capacitor; and a control electrode of the third transistor and a control electrode of the fourth transistor are respectively connected to the first protection chip, a first electrode of the third transistor is connected to a second electrode of the fourth transistor, and a first electrode of the fourth transistor is connected to the first terminal of the second capacitor.

8. The series-parallel connection battery system according to claim 7, wherein the second protection circuit comprises: a second protection chip, a seventh transistor, a ninth transistor, a tenth transistor, an eighth resistor, a ninth resistor, a tenth resistor, a third capacitor and a fourth capacitor;

a first terminal of the fourth capacitor is the first terminal of the second protection circuit and is connected to the second protection chip;

a second electrode of the ninth transistor is the second terminal of the second protection circuit and is connected to a second terminal of the third capacitor, and a second terminal of the eighth capacitor is the third terminal of the second protection circuit and is connected to a first terminal of the third capacitor;

a control electrode of the seventh transistor is connected to a second terminal of the ninth resistor and a first terminal of the tenth resistor, a second terminal of the tenth resistor is the fourth terminal of the second protection circuit, a first electrode of the seventh transistor is connected to a first terminal of the ninth resistor and a first terminal of the eighth resistor, and a second electrode of the seventh transistor is connected to the second protection chip and a second terminal of the fourth capacitor; and a control electrode of the ninth transistor and a control electrode of the tenth transistor are respectively connected to the second protection chip, a first electrode of the ninth transistor is connected to a second electrode of the tenth transistor, and a first electrode of the tenth transistor is connected to the first terminal of the fourth capacitor.

9. The series-parallel connection battery system according to claim 8, wherein the third protection circuit comprises: a third protection chip, an eleventh transistor, a twelfth transistor, a fourteenth resistor, a fifth capacitor and a sixth capacitor;

a first terminal of the sixth capacitor is the first terminal of the third protection circuit and is connected to the third protection chip;

a second electrode of the eleventh transistor is the second terminal of the third protection circuit and is connected to a second terminal of the fifth capacitor, a first terminal of the fourteenth resistor is the third terminal of the third protection circuit and is connected to a first terminal of the fifth capacitor, and a second terminal of the fourteenth resistor is connected to the third protection chip and a second terminal of the sixth capacitor; and a control electrode of the eleventh transistor and a control electrode of the twelfth transistor are respectively connected to the third protection chip, a first electrode of the eleventh transistor is connected to a second electrode of the twelfth transistor, and a first electrode of the twelfth transistor is connected to the first terminal of the sixth capacitor.

10. The series-parallel connection battery system according to claim 9, wherein the first protection circuit further comprises: a first current sampling resistor, a first terminal of the first current sampling resistor is connected to a first electrode of the fourth transistor and the first protection chip, and a second terminal of the first current sampling resistor is connected to the first terminal of the second capacitor and the first protection chip.

11. The series-parallel connection battery system according to claim 9, wherein the first protection circuit further comprises: a first voltage sampling resistor, a first terminal of the first voltage sampling resistor is connected to the first protection chip, and a second terminal of the first voltage sampling resistor is connected to the second electrode of the third transistor.

12. The series-parallel connection battery system according to claim 9, wherein the first protection circuit further comprises: a first thermistor, a second terminal of the first thermistor is connected to the first terminal of the second capacitor, and a first terminal of the first thermistor is the first terminal of the first protection circuit.

13. The series-parallel connection battery system according to claim 1, wherein the charge and discharge management circuit is arranged on a main board; and the switch is arranged on the main board; and the charge and discharge management circuit is connected to the switch and configured to directly control the switch.

14. The series-parallel connection battery system according to claim 3, wherein the switch is arranged on the main board, the first terminal of the switch is connected to the first positive terminal of the series-parallel connection battery, the second terminal of the switch is connected to the second positive terminal of the series-parallel connection battery, the third terminal of the switch is connected to the first terminal of the charge and discharge management circuit, and the second terminal of the charge and discharge management circuit is connected to the sixth terminal of the battery combination management circuit through the communication terminal of the series-parallel connection battery.

15. The series-parallel connection battery system according to claim 9, wherein the second protection circuit further comprises: a second current sampling resistor, a first terminal of the second current sampling resistor is connected to the first electrode of the tenth transistor and the second protection chip, and a second terminal of the second current sampling resistor is connected to the first terminal of the fourth capacitor and the second protection chip.

16. The series-parallel connection battery system according to claim 9, wherein the third protection circuit further comprises: a third current sampling resistor, a first terminal of the third current sampling resistor is connected to the first electrode of the twelfth transistor and the third protection chip, a second terminal of the third current sampling resistor is connected to the first terminal of the sixth capacitor and the third protection chip.

17. The series-parallel connection battery system according to claim 9, wherein the second protection circuit further comprises: a second voltage sampling resistor, a first terminal of the second voltage sampling resistor is connected to the second protection chip, and a second terminal of the second voltage sampling resistor is connected to the second electrode of the ninth transistor.

18. The series-parallel connection battery system according to claim 9, wherein the third protection circuit further comprises: a third voltage sampling resistor, a first terminal of the third voltage sampling resistor is connected to the third protection chip, and a second terminal of the third voltage sampling resistor is connected to the second electrode of the eleventh transistor.

19. The series-parallel connection battery system according to claim 9, wherein the second protection circuit further comprises: a second thermistor, a second terminal of the second thermistor is connected to the first terminal of the fourth capacitor, and a first terminal of the second thermistor is the first terminal of the second protection circuit.

20. The series-parallel connection battery system according to claim 9, wherein the third protection circuit further comprises: a third thermistor, a second terminal of the third thermistor is connected to the first terminal of the sixth capacitor, and a first terminal of the third thermistor is the first terminal of the third protection circuit.

* * * * *